United States Patent [19]

Lines

[11] Patent Number: 4,820,017
[45] Date of Patent: Apr. 11, 1989

[54] OPTICAL FIBER SYSTEMS EMPLOYING MULTICOMPONENT HALIDE GLASS OPTICAL FIBERS

[75] Inventor: Malcolm E. Lines, Millington, N.J.

[73] Assignee: American Telephone and Telegraph Company, AT&T Bell Laboratories, Murray Hill, N.J.

[21] Appl. No.: 94,562

[22] Filed: Sep. 9, 1987

[51] Int. Cl.⁴ .......................... G02B 6/10; G02B 6/00; G02B 6/02
[52] U.S. Cl. .............................. 350/96.30; 350/96.29; 350/96.34
[58] Field of Search ............... 350/96.29, 96.30, 96.34, 350/96.33, 96.15, 96.16

[56] References Cited

U.S. PATENT DOCUMENTS 4,354,735 10/1982 Stowe et al. .................... 350/96.34
4,674,835 6/1987 Mimura et al. .................. 350/96.34
4,699,464 10/1987 Cohen et al. .................... 350/96.34

*Primary Examiner*—William L. Sikes
*Assistant Examiner*—Georgia Y. Epps
*Attorney, Agent, or Firm*—Bernard Tiegerman

[57] ABSTRACT

An optical fiber system which includes a source of electromagnetic radiation, e.g., a laser, in optical communication with a multicomponent halide glass optical fiber is disclosed. This system is distinguished from previous such systems in that, within the context of the inventive system, the multicomponent halide glass fiber exhibits lower intrinsic loss than when used in previous such systems. This is achieved by choosing the source in relation to the composition of the fiber so that the wavelength of at least a portion of the electromagnetic radiation emitted by the source is substantially equal to the minimum intrinsic loss wavelength for the fiber, as determined using a new, more accurate procedure.

4 Claims, 2 Drawing Sheets

OPTICAL FIBER SYSTEMS EMPLOYING MULTICOMPONENT HALIDE GLASS OPTICAL FIBERS

BACKGROUND OF THE INVENTION

1. Field of the Invention

The invention pertains generally to optical systems, and particularly to optical fiber systems.

2. Art Background

Optical systems employing optical fibers as transmission media are now in wide use or have been proposed for a wide variety of uses, including communication, sensing and optical power transmission. These systems typically include a source of electromagnetic radiation, e.g., a laser, as well as an optical fiber which serves to transmit at least a portion of the radiation emitted by the source to a body upon which the radiation is to be impinged, e.g., an optical detector.

A significant factor in the design of optical fiber systems is the optical power loss produced by the optical fiber. This loss is usually measured by relating input optical power, $P_i$, to output optical power, $P_o$, via the relation $$P_o/P_i = 10^{-\alpha L/10}, \tag{1}$$

where $\alpha$ is the loss coefficient of the fiber in decibels per unit length, e.g., per kilometer, of fiber (dB/km), and L is the length of the fiber in corresponding length units.

In the case of, for example, optical fiber communication systems, the optical power loss produced by the fiber attenuates the optical signals transmitted by the fiber. As a consequence, devices, called repeaters, are positioned at regular intervals along the length of the fiber to regenerate the attenuated optical signals. Significantly, the loss coefficient, $\alpha$, of the fiber largely determines the maximum spacing between the repeaters. At present, the fibers employed in such systems are highly purified silica ($SiO_2$) glass fibers which exhibit a minimum loss of about 0.2 dB/km at a wavelength of about 1.55 micrometers ($\mu$m). This value of minimum loss limits the maximum distance between the repeaters to no more than about 100 km.

In the hope of achieving lower optical losses, and thus, for example, larger repeater spacings, optical systems have been proposed employing multicomponent halide glass fibers. (A multicomponent halide glass is a glass derived, for example, from a melt having constituents which include two or more halides.) These proposals are based on the belief that multicomponent halide glasses exhibit minima in their intrinsic losses (losses due to factors other than impurities, compositional variations and defects), at wavelengths between about 2 $\mu$m and about 10 $\mu$m, which are far lower than the minimum loss exhibited by silica glass.

Present-day manufacturing techniques have resulted in multicomponent halide glasses having impurity levels which produce relatively large optical losses in various wavelength regions, including the very wavelength regions of the electromagnetic spectrum where the multicomponent halide glasses are expected to achieve minimum intrinsic losses. As a consequence, the minimum intrinsic loss (vacuum) wavelengths, $\lambda_{min}$, and the corresponding loss coefficients, $\alpha_{min}$, for these glasses are obscured i.e., are not (presently) directly measurable.

In the expectation that new manufacturing and purification techniques will shortly eliminate the unwanted impurities (and defects), optical system designers are even now designing optical fiber systems employing multicomponent halide glass fibers. These designs are based on values of $\lambda_{min}$ and $\alpha_{min}$ derived using extrapolation procedures originally developed for, and applicable to, single-component glasses. That is, as depicted in FIG. 1, which includes a semi-log curve of $\alpha$ versus $1/\lambda$ for an ideally pure, defect-free, single-component glass body, the total (intrinsic) optical loss for such a body is the sum of three contributions. The first of these involves absorption of incident photons by valence band electrons, which promotes the electrons into the conduction band (the energies of the absorbed photons are substantially equal to or greater than the energy gap between the valence and conduction bands). This absorption is typically resonant (maximum) in the ultraviolet region of the spectrum, tailing off into the visible and near-infrared regions in an exponential fashion known as the Urbach edge (see FIG. 1). As a result, $$\alpha(\text{Urbach}) = Ce^{c/\lambda}, \text{ tm} \tag{2}$$

where C and c are positive quantities, approximately independent of the (vacuum) wavelength, $\lambda$. (Regarding the Urbach edge see, e.g., V. Sa-Yakanit et al, *Comments on Condensed Matter Physics*, Vol. 13, pp. 35–48 (1987).)

The second contribution to intrinsic loss is due to absorptions which excite polar optic-phonons, i.e., ionic vibrations involving the creation of electric dipoles. This second type of absorption is typically resonant in the far-infrared wavelength region, tailing off into the near-infrared and visible region in an essentially exponential fashion referred to as the multiphonon edge (see FIG. 1). Thus, $$\alpha(\text{Multiphonon}) = Ae^{-a/\lambda}, \tag{3}$$

where A and a are positive, essentially $\lambda$-independent, material parameters. (Regarding multiphonons see H. G. Lipson et al, *Physical Review B*, Vol 13, pp. 2614–2619 (1976).)

The third contribution to intrinsic loss is due to light scattering by refractive index variations inherent in the material, including: (1) propagating refractive index variations generated by acoustic phonons (ion vibrational excitations manifesting sound waves); (2) propagating refractive index variations generated by optic-phonons; and (3) static refractive index variations due to density fluctuations which were in diffusive thermal equilibrium in the melt but became frozen into the glass on vitrification. Although the scattering mechanisms in (1) and (2) produce scattered radiation which is shifted in wavelength from the incident (vacuum) wavelength, $\lambda$, the shifts are small (compared to $\lambda$). As a consequence, the loss coefficient associated with the sum of the three intrinsic scattering mechanisms (this sum being depicted in FIG. 1) is well approximated by (the so-called Rayleigh form)

$$\alpha(\text{scattering}) = B/\lambda^4, \tag{4}$$

where B is a material parameter, independent of $\lambda$. (Regarding this scattering loss see M. E. Lines, *Journal of Applied Physics*, Vol. 55, pp. 4052–4057 and 4058–4063 (1984).)

From Eqs. (2)–(4), it follows that the loss coefficient, $\alpha$, for an ideally pure, defect-free, single-component glass is given by $$\alpha = Ae^{-a/\lambda} + B/\lambda^4 + Ce^{c/\lambda}. \tag{5}$$

As shown in FIG. 1, the three terms in Eq. (5) define an optic window of relatively low attenuation, i.e., a range of wavelengths where $\alpha$ is relatively small. Significantly, the absolute minimum loss coefficient, $\alpha_{min}$, is positioned within the optic window at a vacuum wavelength, $\lambda_{min}$, where the dominant loss involves (Rayleigh) scattering and multiphonons, i.e., the Urbach term in Eq. (5) is negligibly small. Consequently, for purposes of predicting $\lambda_{min}$ and $\alpha_{min}$, the intrinsic loss coefficient, $\alpha$, is well approximated by the sum of the multiphonon and scattering terms only, i.e., $$\alpha = Ae^{-a/\lambda} + B/\lambda^4. \tag{6}$$

Differentiating Eq. (6) with respect to $\lambda$ and equating the result to zero yields $\lambda_{min}$ and $\alpha_{min}$ as the solutions to $$\lambda^3_{min} \exp(-a/\lambda_{min}) = 4B/Aa \tag{7}$$

and $$\alpha_{min} = (B/\lambda^4_{min})(1 + 4\lambda_{min}/a). \tag{8}$$

When estimating values of $\lambda_{min}$ and $\alpha_{min}$ for multicomponent halide glasses, using semi-log curves of measured values of $\alpha$ versus $\lambda^{-1}$ (where $\lambda_{min}$ and $\alpha_{min}$ are obscured by extrinsic losses), optical system designers have employed techniques which exactly parallel those applicable to single-component glasses. That is, these designers have assumed that a single exponential curve, and thus a single value of the exponent a, is sufficient to define the multiphonon edge for any multicomponent halide glass both in the unobscured and obscured regions of the measured $\alpha$ versus $\lambda^{-1}$ curve. Based upon this assumption, these designers have fitted a single exponential to the unobscured data, and have extended this exponential into the obscured region. In addition, by using light scattering techniques to define the value of the parameter B, system designers have similarly extended the portion of the loss curve clearly attributable to (Rayleigh) scattering into the obscured region. The point of intersection of these two curves has been used to define $\lambda_{min}$ and $\alpha_{min}$, which is substantially equivalent to the differentiation procedure, described above.

Thus, those engaged in the design and development of optical fiber systems employing multicomponent halide glass fibers have sought, and continue to seek, improved techniques for determining $\lambda_{min}$ and $\alpha_{min}$.

SUMMARY OF THE INVENTION

The invention involves the finding that the multiphonon edge for a multicomponent halide glass is not, in general, represented by a single exponential. As a consequence, previous estimates for $\lambda_{min}$ and $\alpha_{min}$ for multicomponent halide glasses, obtained using conventional extrapolation procedures, are in error by significant amounts.

The invention also involves the finding that the multiphonon edge for any multicomponent halide glass of uniform composition, in which the halides include the same halogen, is represented by a weighted sum of exponentials, with each exponential representing the multiphonon absorption of an individual halide, and with each weight being equal to the corresponding halide mole fraction. Adding the expression for Rayleigh scattering to this new expression for multiphonon absorption, differentiating with respect to $\lambda$ and setting the result equal to zero, leads to equations whose solutions yield much more accurate values for $\lambda_{min}$ and $\alpha_{min}$.

BRIEF DESCRIPTION OF THE DRAWINGS

The invention is described with reference to the accompanying drawings wherein.

DETAILED DESCRIPTION

The invention is directed to an optical fiber system, the embodiments of which include, among other things, an optical fiber communication system, an optical fiber sensing system and an optical fiber (optical) power transmission system.

Figure 1:
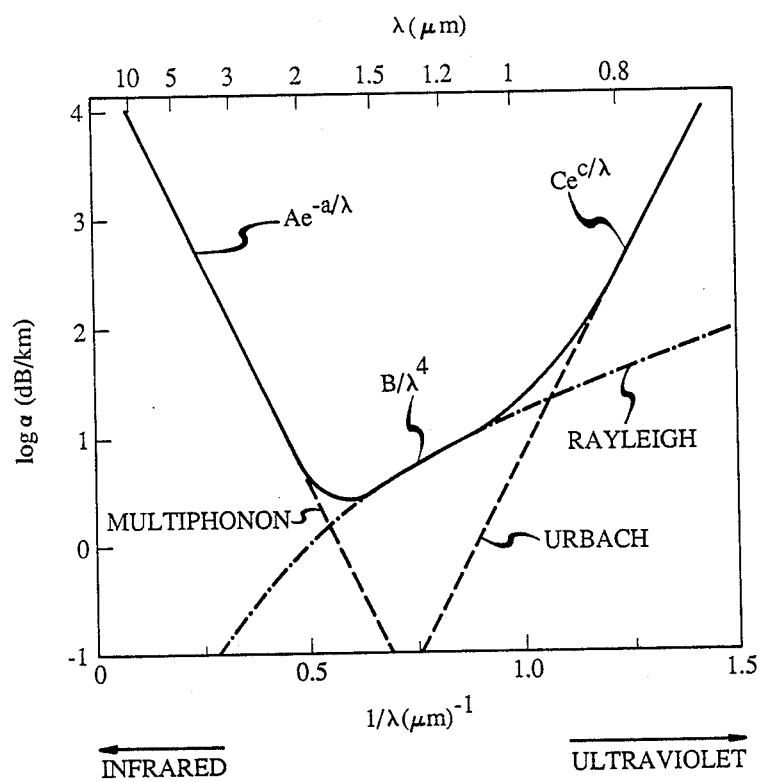
FIG. 1 is a semi-log curve of loss coefficient, $\alpha$, versus the inverse of vacuum wavelength, $1/\lambda$, for an ideally pure, defect-free, single-component glass body.
Figure 2:
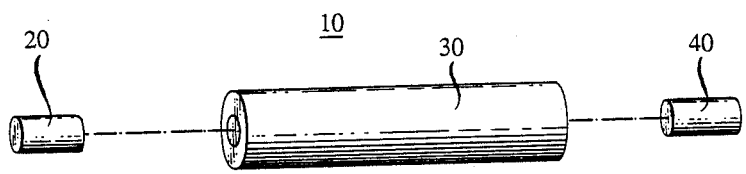
FIGS. 2 and 3 are schematic diagrams of, respectively, first and second embodiments of the inventive optical fiber system.
Figure 3:
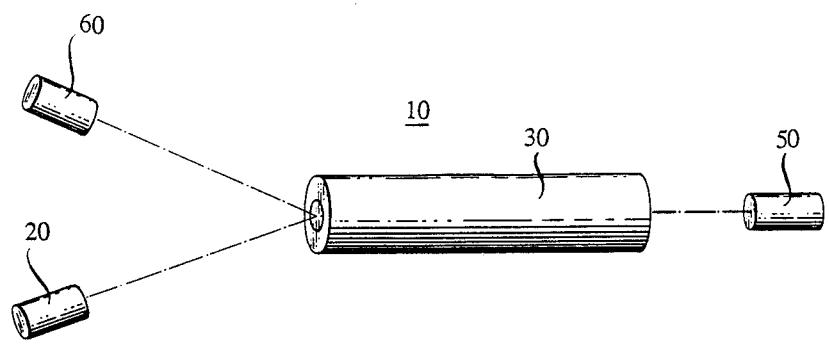

The inventive optical fiber system 10, in all of its embodiments (two of which are depicted in FIGS. 2 and 3), includes a source 20 of electromagnetic radiation, e.g., a laser. In addition, the system includes an optical fiber 30 which is in optical communication with the source 20, and thus serves to transmit at least a portion of the electromagnetic radiation emitted by the source.

The different embodiments of the inventive optical fiber system 10 often include additional components. For example, the embodiment depicted in FIG. 2, which is an optical fiber communication system, also includes an optical detector 40 which is in optical communication with the optical fiber 30. By virtue of this communication, the detector 40 receives at least a portion of the electromagnetic radiation emitted by the source 20 and transmitted by the fiber 30.

The embodiment depicted in FIG. 3 is an optical fiber sensing system. In addition to the source 20 and fiber 30, this embodiment includes a sensor 50, i.e., a transducer device 50, which optically communicates with an optical detector 60 either through the fiber 30 (as shown in FIG. 3) or through a second optical fiber. In either case, in operation, at least a portion of the radiation emitted by the source 20 and transmitted by the fiber 30 is either reflected by the sensor 50 back into the fiber 30, or is reflected or transmitted by the sensor 50 into the second optical fiber, and thus transmitted to the optical detector 60. If an appropriate external stimulus impinges upon the sensor 50, then the sensor (a transducer device) alters a property, e.g., the intensity, phase and/or polarization, of the light transmitted to the detector 60. (Regarding such transducer devices see, e.g., *Proceedings of the SPIE Conference on Fiber Optic and Laser Sensors*, IV, Vol. 718, Sept. 22–24, 1986, Cambridge, Mass.)

The optical fiber 30 employed in the inventive system 10 is a multicomponent halide glass fiber, i.e., a glass fiber having a composition which includes two or more halides (fluorides, chlorides, bromides or iodides). Significantly, this fiber includes at least one material region where each halide includes the same halogen (fluorine, chlorine, bromine, or iodine). For the sake of convenience, each such halide is hereafter represented by the formula unit $MX_Z$, where M denotes the halide cation, X denotes the halide anion, and Z denotes the formal valence of the cation. (Formal valence, for purposes of the invention, and in accordance with conventional usage, is a positive integer which denotes the number of halogens per cation in the halide formula unit.) Such a multicomponent halide glass fiber is readily fabricated (using conventional techniques) from a glass body derived, for example, from a melt having constituents which include the two or more halides.

The inventive optical fiber system 10 is distinguished from previous such systems in that, within the context of the inventive system, the optical fiber 30 exhibits significantly lower intrinsic optical loss than when used in previous such systems. This is achieved, in accordance with the invention, by choosing the source 20 in relation to the composition of the fiber 30 so that the wavelength of at least a portion of the electromagnetic radiation emitted by the source is substantially equal to $\lambda_{min}$, the minimum intrinsic loss wavelength for the fiber as determined using the new, more accurate procedure, described below. (A wavelength is substantially equal to $\lambda_{min}$, for purposes of the invention, provided the absolute value of the difference between the wavelength and $\lambda_{min}$ is less than or equal to ten percent, and preferably less than or equal to 5 percent, of $\lambda_{min}$.)

The inventive procedure for determining $\lambda_{min}$ involves the finding that the portion of the loss coefficient attributable to multiphonon absorption, for any multicomponent halide glass of uniform composition, in which the halides include the same halogen, is not, in general, represented by a single exponential. Rather, it has been found that this portion is given by a weighted sum of exponentials, with each exponential representing the multiphonon absorption of one of the individual halides, and with each weight being the mole fraction of the corresponding halide. In addition, it has been found that the intrinsic scattering contribution to the loss coefficient of a multicomponent halide glass (of uniform composition) is (as previously assumed) represented by a single term of Rayleigh form. Further, it has been confirmed that the multiphonon and scattering terms dominate the loss coefficient in the wavelength regions where the multicomponent halide glasses exhibit their minimum intrinsic losses. Thus, in such a wavelength region, the loss coefficient, $\alpha$, for any multicomponent halide glass of uniform composition, where the halides include the same halogen, is given by $$\alpha = \sum_{i=1}^{n} x_i A_i e^{-a_i/\lambda} + B/\lambda^4, \quad (9)$$

where the subscript i (i=1, ..., n) is used to denote the individual halides, n(n≥2) denotes the number of halides and $x_i$ denotes the mole fraction of the ith halide, $(MX_Z)_i$.

Significantly, with but one exception, discussed below, it has been found that the $A_i$s for all halides are constants whose values depend upon, and increase with, the formal valency of the halide cation. That is, for halides having (formally) monovalent, divalent, trivalent and tetravalent cations, it has been found that the corresponding $A_i$ is, respectively, $0.5 \times 10^{10}$ dB/km, $2 \times 10^{10}$ dB/km, $4 \times 10^{10}$ dB/km and $7 \times 10^{10}$ dB/km. The one exception involves halides where the cation is the beryllium ion, for which $A_i$ is $5 \times 10^{11}$ dB/km.

Equally significantly, it has been found that, physically, each $a_i$ in Eq. (9) is proportional to the inverse of an average frequency of the polar optic-phonons associated with the halide in question. Correspondingly, in mathematical terms, it has been found that, when expressed in units of micrometers ($\mu$m), $a_i$ is given by $$a_i = 12.0(\mu V_M/SZ^{\frac{1}{2}})_i^{\frac{1}{2}}, \quad (10)$$

where $V_{Mi}$ denotes the molar volume of the ith halide in units of cubic centimeters (cm³), $S_i(=Z+1)$ denotes the number of ions in the formula unit of the ith halide, and $Z_i$ denotes the formal valence of the cation in the ith halide. (The molar volume of a halide is just the ratio of the molecular weight of the halide to the density of the halide, which are listed in references such as, for example, *CRC Handbook of Chemistry and Physics*, edited by R. C. Weast (CRC Press, Boca Raton, Fla., 1986), Volume 67.) In addition, $\mu_i$ denotes the reduced mass of the ith halide during the polar vibrations, i.e., vibrations involving the cations of the ith halide oscillating out of phase with the anions of the ith halide. Thus, if the cations and anions have masses of, respectively, $m_M$ and $m_X$, expressed in units of atomic mass number, then $\mu_i$ is given by $$\mu_i = (m_M m_X)_i/[m_M + Zm_X]_i. \quad (11)$$

Using the formulas in Eqs. (10) and (11), the values of the a s for a large number of single-component halides have been computed and listed in Table 1.

Significantly, the scattering parameter, B, in Eq. (9), can, in some instances, be measured. That is, techniques are available for measuring light scattering from glass bodies. (Regarding these techniques see, e.g., D. C. Tran et al, *Electronic Letters*, Vol. 22, pp. 117-118 (1986).) If the scattering is dominated by intrinsic scattering, and is thus of Rayleigh form, then B is readily inferred. However, if the scattering is not of Rayleigh form, e.g., the scattering is dominated by extrinsic scattering of non-Rayleigh form, then B must be calculated. In this regard, it is known that the dominant intrinsic scattering in any multicomponent halide glass is due to static density fluctuations (and thus static refractive index variations) which were in thermal equilibrium in the melt but became frozen into the glass on vitrification. This knowledge has led others to the conclusion that $$B = 5.0 \times 10^{-5} n_o^8 P^2 T_F K_T(T_F). \quad (12)$$

In Eq. (12), $n_o$ denotes the refractive index (a dimensionless parameter, weakly dependent on wavelength) of the multicomponent halide glass, evaluated at $\lambda = \lambda_{min}$. Additionally, P denotes the elasto-optic coefficient (also dimensionless and also weakly dependent on wavelength) of the glass at $\lambda = \lambda_{min}$, i.e., $$P = [(\rho/\epsilon^2)(\partial\epsilon/\partial\rho)]_{\lambda = \lambda_{min}}, \quad (13)$$

where $\rho$ denotes the density of the glass and $\epsilon(=n_o^2)$ denotes the electronic dielectric constant of the glass. Further, $T_F$ denotes the fixation temperature of the multicomponent halide glass, i.e., the temperature at which density fluctuations in the melt are frozen into the glass. Still further, $K_T(T_F)$ denotes the static isothermal compressibility (or, equivalently, the reciprocal of the bulk modulus) of the glass at $T_F$, i.e., $$K_T(T_F) = (1/\rho)(\partial \rho / \partial p)_{T=T_F},\qquad (14)$$

where p denotes pressure. If B is to have units of $dB(\mu m)^4/km$ in Eq. (12), then $T_F$ should be in degrees Kelvin (K) and $K_T$ in units of $10^{-12} cm^2/dyne$. (Regarding Eq. (12), see, e.g., D. A. Pinnow et al, *Applied Physics Letters*, Vol. 22, pp. 527–529 (1973).)

Although Eq. (12) does, in principle, allow one to calculate B, it requires, among other things, accurate values for the elasto-optic coefficient, P, which must be measured. Unfortunately, these measurements have been made for only a few multicomponent halide glasses. Moreover, there is some question concerning the reproducibility of these measurements, and thus some question concerning the accuracy of the corresponding values for B. Consequently, a new formulation for the scattering parameter, B, has been developed. This new formulation involves the finding that $$n_o^4 P = (n_o^2 - 1)(1 - \Lambda),\qquad (15)$$

where $\Lambda$ denotes the fractional change in anion-cation bond polarizability, $\chi_b$, with fractional change in density, $\rho$, of the multicomponent halide glass, evaluated at $\lambda = \lambda_{min}$, i.e., $$\Lambda = -[(\rho / \chi_b)(\partial \chi_b / \partial \rho)]_{\lambda = \lambda_{min}}.\qquad (16)$$

As a consequence, Eq. (12) may now be written as $$B = 5.0 \times 10^{-5}(n_o^2 - 1)^2(1 - \Lambda)^2 T_F K_T(T_F).\qquad (17)$$

Significantly, as discussed below, the parameter $\Lambda$ is readily determined for any multicomponent halide glass of uniform composition.

Regardless of whether Eq. (12) or Eq. (17) is used to calculate B, certain common parameters must be known or measured before such a calculation is possible. Included among these are the refractive index of the multicomponent halide glass, $n_o$ (evaluated at $\lambda = \lambda_{min}$). In this regard, it has been found that evaluating $n_o$ at visible wavelengths, i.e., wavelengths ranging from about 4000 to about 7000 Angstroms, rather than at $\lambda = \lambda_{min}$, is adequate for purposes of the invention. Moreover, in many instances, it is precisely these values of $n_o$ which have been measured and published (see, e.g., M. G. Drexhage, *Treatise on Material Science and Technology*, Vol. 26, edited by M. Tomozawa et al (Academic Press, New York, 1985), pp. 151–243.) However, in other instances, only the refractive indices of the individual halides, $n_i$, have been measured (at visible wavelengths). (Generally, the individual halides are not good glass formers and are typically crystalline in nature. As a consequence, as used here, and in the literature, the refractive index of an individual halide, $n_i$, denotes the average of the refractive indices along the three principal crystalline axes. Regarding the measured, refractive indices of single-component halides see, e.g., *CRC Handbook*, supra; and S. Kondo et al, *Journal of the Physical Society of Japan*, Vol. 50, pp. 3047–3053 (1981).) In this circumstance, it is known that $$n_o^2 - 1 = \sum_{i=1}^{n} x_i(n_i^2 - 1),\qquad (18)$$

where $x_i$ denotes the fractional molar concentration of the ith halide.

Generally, because the difference between the two is very small, the glass transition temperature, $T_g$, may be substituted for the fixation temperature, $T_F$, in Eqs. (12) and (17) for any multicomponent halide glass. In addition, values of $T_g$ are readily found in the literature. (Regarding published values of $T_g$ see, e.g., Drexhage, supra.)

Typically, the static isothermal compressibilities at $T_F$ of the multicomponent halide glasses, $K_T(T_F)$, are not presently known. In addition, because the individual halides are not fluids at the fixation temperatures of the multicomponent halide glasses, even the static isothermal compressibilities which the individual halides would exhibit if they were fluids at $T = T_F$, i.e., $K_{Ti}(T = T_F)$, are not known. However, for many individual chlorides, bromides and iodides, the isothermal compressibilities in the melt, and particularly at the melting temperature, $T_{mi}$, i.e., $K_{Ti}(T_{mi})$, have been measured and published, and are collected in Table 2. In addition, in the case of many individual fluorides, the room temperature (300 K.) elastic compliances, $s_{ij}$ (i,j = 1,2,3), where i,j denote the material principal axes, have been measured and published. This is relevant because, in the case of these fluorides, the (crystalline) adiabatic compressibilities at room temperature (300 K.) are equal to a known, specific sum of the room temperature elastic compliances. Moreover, and for solids, such as these (crystalline) fluorides, the isothermal compressibilities are essentially equal to the adiabatic compressibilities. Consequently, the isothermal compressibilities at room temperature, i.e., $K_{Ti}(300 K.)$, of these fluorides are also accurately given by the specific sum of the room temperature elastic compliances, i.e., $$K_{Ti}(300 K.) = [s_{11} + s_{22} + s_{33} + 2(s_{12} + s_{23} + s_{13})]_i.\qquad (19).$$

(Regarding the published values of $K_{Ti}(Tm)$ and $s_{ij}$ see, e.g., G. J. Janz, *Molten Solids Handbook* (Academic Press, New York, 1967); and *Landolt*-Bornstein, Vol. III/11, edited by K. H. Hellweger et al (Springer-Verlag, Berlin, 1978).)

Significantly, it has been found that the isothermal compressibility at $T_F$ of any multicomponent halide glass is related to the isothermal compressibilities which the individual halides would exhibit if they were fluids at $T = T_F$ through the formula $$K_T(T_F) = \sum_{i=1}^{n} x_i K_{Ti}(T = T_F).\qquad (20)$$

In addition, it has been found that $$K_T(T_F) \approx 0.6\, K_T(T_m),\qquad (21)$$

$$K_{Ti}(T = T_F) \approx 0.6\, K_{Ti}(T_m),\qquad (22)$$

$$K_T(T_F) \approx 3.5\, K_T(300 K.),\qquad (23)$$

and $$K_{Ti}(T = T_F) \approx 3.5\, K_{Ti}(300 K.).\qquad (24)$$

Thus, by using the relations in Eqs. (22) and (24), in conjunction with Eq. (19) and the published values of $K_{Ti}(T_m)$, in Eq. (20), $K_T(T_F)$ is readily computed.

If, for example, Eq. (17) is used to calculate B, then $\Lambda$ must be determined. It has been found that this is readily achieved using the following procedure. That is, it has been found that the value of $\Lambda$ for any multicomponent halide glass of uniform composition is related to the corresponding values for the constituent single-component halides, $\Lambda_i$, through the relation $$\Lambda = \sum_{i=1}^{n} x_i \Lambda_i \tag{25}$$

Figure 4:
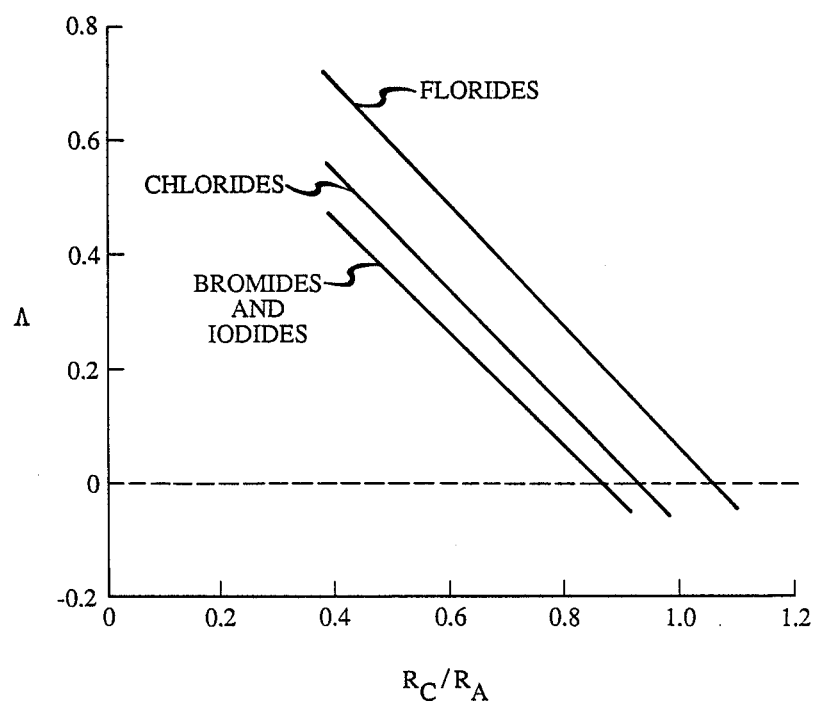
FIG. 4 includes curves of the fractional decrease of bond polarizability with fractional increase in density, $\Lambda_i$, for Class I single-component halides, as a function of the ratio of the radius of the corresponding halide cation to the radius of the corresponding halide anion. $R_C/R_A$.

In addition, it has been found that, in terms of the $\Lambda_i$s, there are three classes of single-component halides, with the first class (Class I) encompassing all the fluorides except $BeF_2$, all alkali halides, $CaCl_2$, $CaBr_2$ and $SrCl_2$, the second class (Class II) encompassing just $BeF_2$, $ZnCl_2$ and $ZnBr_2$, and the third class (Class III) encompassing all the remaining halides. Significantly, in the case of the Class I single-component halides, it has been found that the $\Lambda_i$s are a function of, and decrease with, the ratio of the radius of the corresponding halide cation, $R_C$, to the radius of the corresponding halide anion, $R_A$, i.e., $R_C/R_A$. This relationship has been plotted in FIG. 4 for each type of Class I halide, i.e., for the fluorides, chlorides, bromides and iodides encompassed by Class I. Thus, given the value of $R_C/R_A$ for any such Class I single-component halide, the corresponding value of $\Lambda_i$ is readily determined from FIG. 4. (Regarding values of $R_C/R_A$ for a wide variety of Class I single-component halides see, e.g., *CRC Handbook*, supra.) In the case of the Class II halides, it has been found that all the $\Lambda_i$s are equal +0.1, while for the Class III halides all the $\Lambda_i$s are equal to −0.4. Consequently, the value of $\Lambda$ for any multicomponent halide glass is now readily determined via Eq. (25).

Because the parameters $a_i$, $A_i$ and B are readily determined, or have been determined, as described above, specific values of $\alpha$ in the low intrinsic loss region are readily calculated via Eq. (9). Moreover, differentiating Eq. (9) with respect to $\lambda$ and setting the result equal to zero leads to two equations whose solutions yield much more accurate values of $\lambda_{min}$ and $\alpha_{min}$ for any multicomponent halide glass where the halides include the same halogen. These equations are $$\lambda_{min}^3 \sum_{i=1}^{n} x_i A_i a_i \exp(-a_i/\lambda_{min}) = 4B, \tag{26}$$

and $$\alpha_{min} = \sum_{i=1}^{n} x_i A_i \exp(-a_i/\lambda_{min}) + B/\lambda_{min}^4 \tag{27}$$

Using Eqs. (26) and (27), the values of $\lambda_{min}$ and $\alpha_{min}$ for any multicomponent halide glass of uniform composition, in which the halides include the same halogen, are readily calculated (as demonstrated in the Examples, below).

Significantly, it has been determined that the inventive procedure for determining $\lambda_{min}$ and $\alpha_{min}$ is not only applicable to a multicomponent halide glass of uniform composition, but is also directly applicable to any multicomponent halide glass having a composition which is only substantially uniform, i.e., the glass includes regions having different relative (non-zero) amounts of the same constituents. (In this circumstance, the application of the inventive procedure to the different regions yields values of $\lambda_{min}$ which differ only minutely.)

If the glass is not of substantially uniform composition, i.e., the glass includes regions having different constituents, but the optical power is largely confined to only one region which is of substantially uniform composition, then the inventive procedure for determining $\lambda_{min}$ and $\alpha_{min}$ is directly applicable to this one region.

If the glass includes regions having different constituents (and the optical power is not largely confined to any of them), then the values of $\lambda_{min}$ for these regions are often significantly different. However, the above findings make possible the accurate determination of a wavelength which minimizes optical loss for the glass as a whole. That is, if the orthogonal coordinate system ($\xi$, $\eta$, $\zeta$) is used to define the position of a point within the glass, and if the incident electromagnetic radiation impinges upon a surface of the glass, S, located at $\zeta=0$, where the intensity is $I(\xi, \eta, 0)$, then the input optical power, $P_i$, to the glass is just $$P_i = \int_S \int I(\xi,\eta,0) d\xi d\eta. \tag{28}$$

If the glass is a cylinder of essentially uniform (but not necessarily circular) cross-section having its axis of symmetry along the $\zeta$-axis, if the incident radiation traverses the glass in the $\zeta$-direction, if the cylindrical glass is of length L, and if the composition (and thus the loss coefficient of the glass, $\alpha$) varies with position in a known manner, then the output optical power, $P_o$, is given by $$P_o = \int_S \int I(\xi,\eta,0) \, 10^{-\int_0^L \alpha(\xi,\eta,\zeta;\lambda) d\zeta/10} d\xi d\eta. \tag{29}$$

By analogy with Equation (1), the average loss coefficient for the glass, $\bar{\alpha}$, is just $$P_o/P_i = 10^{-\bar{\alpha}L/10}. \tag{30}$$

On substituting Equations (28) and (29) into Equation (30), it follows that $$\bar{\alpha}(\lambda) = -\left(\frac{10}{L}\right) \log_{10} \left\{ \frac{\int_S \int I(\xi,\eta,0) \cdot 10^{-\int_0^L \alpha(\xi,\eta,\zeta;\lambda) d\zeta/10} d\xi d\eta}{\int_S \int I(\xi,\eta,0) d\xi d\eta} \right\}. \tag{31}$$

Differentiating the above formula for $\bar{\alpha}$ with respect to $\lambda$ (where $\alpha$ is given by Equation (9), and the parameters $x_i$, $A_i$, $a_i$ and B are all functions of $\xi$, $\eta$ and $\zeta$), and setting the result equal to zero, leads to formulas (analogous to Equations (26) and (27)) for the desired $\lambda_{min}$ and $\alpha_{min}$.

EXAMPLE 1

Consider the multicomponent fluoride glass 0.57ZrF$_4$-0.36BaF$_2$-0.03LaF$_3$-0.04AlF$_3$, where the numerical coefficients 0.57, 0.36, 0.03 and 0.04 denote the mole fractions of the constituent, single-component, Class I halides. This is a member of a much investigated class of fluoride glasses usually referred to by the acronym ZBLA. From Table 1, the $a_i$ values for the constituent, single-component fluorides, in order of increasing size, are a(AlF$_3$)=61, a(ZrF$_4$)=75, a(LaF$_3$)=96 and a(BaF$_2$)=135. Because the cations in AlF$_3$, ZrF$_4$, LaF$_3$ and BaF$_2$ have formal valencies of, respectively, +3, +4, +3 and +2, it follows that the corresponding $A_i$ values are $4 \times 10^{10}$, $7 \times 10^{10}$, $4 \times 10^{10}$ and $2 \times 10^{10}$ dB/km. Consequently, from Eq. (9), it follows that $$\alpha = \sum_{i=1}^{4} x_i A_i \exp(-a_i/\lambda) + B/\lambda^4$$
$$= (0.04)(4 \times 10^{10})e^{-61/\lambda} + (0.57)(7 \times 10^{10})e^{-75/\lambda} +$$
$$(0.03)(4 \times 10^{10})e^{-96/\lambda} + (0.36)(2 \times 10^{10})e^{-135/\lambda} +$$
$$B/\lambda^4 \text{ dB/km}.$$

From Eq. (17), it follows that $n_o$, $T_F$, $K_T(T_F)$ and $\Lambda$ must be known to calculate B. The first two parameters are known (see, e.g., Table II of Drexhage, supra), i.e., $n_o = 1.516$ and $T_F \approx T_g = 583$ K. By contrast, the last two parameters are not known. However, the room-temperature, static isothermal compressibility of this ZBLA glass is known, i.e., $K_T(300 \text{ K.}) = 2.08 \times 10^{-12}$ cm$^2$/dyne (see Table VIII of Drexhage, supra). Consequently, from Eq. (23), it follows that $K_T(T_F) \approx 3.5 \, K_t(300 \text{ K.}) = 7.3 \times 10^{-12}$ cm$^2$/dyne. In addition, the values of $R_C/R_A$ for each of the Class I single-component fluorides are available from the literature (see CRC Handbook, supra), i.e. $R_C/R_A$(AlF$_3$)=0.38, $R_C/R_A$(ZrF$_4$)=0.59, $R_C/R_A$(LaF$_3$)=0.80 and $R_C/R_A$(BaF$_2$)=1.01. From FIG. 4, it follows that the corresponding $\Lambda_i$ values are $\Lambda$(AlF$_3$)=0.7, $\Lambda$(ZrF$_4$)=0.5, $\Lambda$(LaF$_3$)=0.3 and $\Lambda$(BaF$_2$)=0.1. Thus, $$\Lambda = \sum_{i}^{4} x_i \Lambda_i = 0.36.$$

On substituting the above values of $n_o$, $T_F$, $K_T(T_F)$ and $\Lambda$ into Eq. (17), it follows that B=0.15 (dB/km)($\mu$m)$^4$. Therefore, $$\alpha = (0.04)(4 \times 10^{10})e^{-61/\lambda} + (0.57)(7 \times 10^{10})e^{-75/\lambda}$$
$$+ (0.03)(4 \times 10^{10})e^{-96/\lambda} + (0.36)(2 \times 10^{10})e^{-135/\lambda} + 0.15/\lambda^4 \text{ dB/km}.$$

Differentiating the above function for $\alpha$ with respect to $\lambda$ and setting the result equal to zero leads to the conclusion that $\lambda_{min} = 2.17 \, \mu$m and $\alpha_{min} = 0.008$ dB/km.

EXAMPLE 2

Consider the multicomponent chloride glass 0.5CdCl$_2$-0.4 BaCl$_2$-0.1KCl. From Table 1, the $a_i$ values for the constituent, single-component chlorides, in order of increasing size, are a(CdCl$_2$)=183, a(BaCl$_2$)=207 and a(KCl)=224. Because the cations in CdCl$_2$, BaCl$_2$ and KCl have formal valencies of, respectively, +2, +2, and +1, it follows that the corresponding $A_i$ values are $2 \times 10^{10}$, $2 \times 10^{10}$ and $0.5 \times 10^{10}$ dB/km. Consequently, from Eq. (9), it follows that $$\alpha = \sum_{i=1}^{3} x_i A_i \exp(-a_i/\lambda) + B/\lambda^4$$
$$= (0.5)(2 \times 10^{10})e^{-183/\lambda} + (0.4)(2 \times 10^{10})e^{-207/\lambda} +$$
$$(0.1)(0.5 \times 10^{10})e^{-224/\lambda} + B/\lambda^4 \text{ dB/km}.$$

From Eq. (17), $n_o$, $T_F$, $K_T(T_F)$ and $\Lambda$ must be known to calculate B. Of these four parameters, only $T_F$ is known, i.e., $T_F \approx T_g = 453$ K. (see M. Poulain et al, Materials Research Bulletin, Vol. 18, pp. 631–636 (1983)). In addition, the refractive indices for the individual chlorides are known, i.e., $n_o$(CdCl$_2$)=1.76, $n_o$(BaCl$_2$)=1.73 and $n_o$(KCl)=1.49 (see CRC Handbook, supra and S. Kondo et al, supra). From Eq. (18), it follows that the refractive index for the multicomponent chloride glass is $n_o = 1.72$. Moreover, the isothermal compressibilities at T=T$_m$ of the individual chlorides are known and are included in Table 2, i.e., $K_T$(CdCl$_2$)(T=T$_m$)=29×10$^{-12}$ cm$^2$/dyne, $K_T$(BaCl$_2$)(T=T$_m$)=14×10$^{-12}$ cm$^2$/dyne and $K_T$(KCl)(T=T$_m$)=37×10$^{-12}$ cm$^2$/dyne. Because KCl is a Class I halide, the corresponding $\Lambda_i$ is dependent on $R_C/R_A$, which is available from the literature (see CRC Handbook, supra), i.e., $R_C/R_A$(KCl)=0.73. From FIG. 4, this $\Lambda_i$ value is $\Lambda$(KCl)=0.2. Crystalline CdCl$_2$ and amorphous BaCl$_2$ are Class III halides, and therefore the corresponding $\Lambda_i$ values are $\Lambda$(CdCl$_2$)=−0.4 and $\Lambda$(BaCl$_2$)=−0.4. Thus, from Eq. (25), it follows that, for the multicomponent chloride glass, $\Lambda = -0.34$. On substituting the above values of $n_o$, $T_F$, $K_T(T_F)$ and $\Lambda$ into Eq. (17), it follows that B=2.2 (dB/km)($\mu$m)$^4$. Therefore, $$\alpha = (0.5)(2 \times 10^{10})e^{-183/80} + (0.4)(2 \times 10^{10})e^{-207/\lambda} + (0.1)(0.5 \times 10^{10})e^{-224/\lambda} + 2.2/\lambda^4 \text{ dB/km}.$$

Differentiating the above function for $\alpha$ with respect to $\lambda$ and setting the result equal to zero leads to the conclusion that $\lambda_{min} = 5.83 \, \mu$m and $\alpha_{min} = 0.0021$ dB/km.

TABLE 1

The multiphonon exponent "a" in $\mu$m as calculated from Eq. (10) for a fairly complete list of halides.

| | X = F | X = Cl | X = Br | X = I |
|---|---|---|---|---|
| LiX | 60 | 93 | 107 | 125 |
| NaX | 111 | 165 | 203 | 239 |
| KX | 147 | 224 | 286 | 338 |
| RbX | 181 | 279 | 383 | 469 |
| CsX | 210 | 292 | 415 | 519 |
| CuX | — | 198 | 271 | 321 |
| AgX | 159 | 223 | 310 | 416 |
| InX | — | 264 | 409 | 444 |
| TlX | 184 | 273 | 394 | 506 |
| HgX | 177 | 268 | 397 | 488 |
| BeX$_2$ | 54 | 76 | 84 | 95 |
| MgX$_2$ | 70 | 112 | 133 | 154 |
| CaX$_2$ | 90 | 150 | 180 | 209 |
| SrX$_2$ | 115 | 186 | 237 | 288 |
| BaX$_2$ | 135 | 207 | 279 | 339 |
| CuX$_2$ | 98 | 150 | 190 | — |
| InX$_2$ | — | 194 | 272 | 324 |
| ZnX$_2$ | 92 | 164 | 205 | 244 |
| CdX$_2$ | 104 | 183 | 242 | 292 |
| HgX$_2$ | 120 | 211 | 298 | 369 |
| SnX$_2$ | 107 | 190 | 251 | 311 |
| PbX$_2$ | 127 | 206 | 290 | 381 |
| ScX$_3$ | 83 | 118 | 138 | — |
| YX$_3$ | 94 | 157 | 195 | 240 |
| LaX$_3$ | 96 | 163 | 213 | 255 |

TABLE 1-continued

The multiphonon exponent "a" in $\mu m$ as calculated from Eq. (10) for a fairly complete list of halides.

| | X = F | X = Cl | X = Br | X = I |
|---|---|---|---|---|
| LuX$_3$ | 100 | 180 | ? | ? |
| BX$_3$ | — | — | — | 92 |
| AlX$_3$ | 61 | 90 | 130 | 134 |
| GaX$_3$ | 78 | 144 | 177 | 211 |
| InX$_3$ | 102 | 156 | 201 | 254 |
| TlX$_3$ | 98 | 183 | — | — |
| AsX$_3$ | — | — | 187 | 212 |
| SbX$_3$ | 105 | 169 | 221 | 256 |
| BiX$_3$ | 125 | 180 | 246 | 309 |
| ZrX$_4$ | 75 | 129 | 159 | ? |
| HfX$_4$ | 82 | ? | ? | ? |
| ThX$_4$ | 100 | 161 | 217 | ? |
| PbX$_4$ | 93 | 182 | — | — |
| GeX$_4$ | — | — | 163 | 175 |
| SnX$_4$ | 82 | 165 | 202 | 220 |
| SeX$_4$ | — | 103 | ? | — |
| TeX$_4$ | — | 141 | 185 | 208 |
| NbX$_5$ | 76 | 113 | ? | — |
| TaX$_5$ | 88 | 137 | 182 | — |
| WX$_6$ | — | 125 | 134 | — |

— signifies that the material does not exist in solid form at room temperature.
? signifies that the molar volume $V_M$ is unavailable for insertion into Eq. (10).

TABLE 2

Halide melt isothermal compressibilities $K_T$ (in units of $10^{-12}$ cm$^2$/dyne) at the melting temperature $T_m$, as taken or extrapolated from the literature.

| Halide | $T_m$(°C.) | $K_T(T_m)$ | Halide | $T_m$(°C.) | $K_T(T_m)$ |
|---|---|---|---|---|---|
| LiCl | 605 | 19 | MgCl$_2$ | 714 | 74 |
| NaCl | 808 | 29 | MgBr$_2$ | 700 | 90 |
| KCl | 772 | 37 | MgI$_2$ | 650 | 111 |
| CsCl | 645 | 39 | CaI$_2$ | 784 | 27 |
| LiBr | 550 | 22 | SrI$_2$ | 515 | 17 |
| NaBr | 747 | 31 | ZnCl$_2$ | 318 | 58 |
| KBr | 734 | 39 | ZnBr$_2$ | 394 | 49 |
| CsBr | 636 | 50 | ZnI$_2$ | 446 | 56 |
| NaI | 661 | 38 | CdCl$_2$ | 568 | 29 |
| KI | 681 | 48 | CdBr$_2$ | 567 | 41 |
| CsI | 626 | 65 | CdI$_2$ | 388 | 44 |
| AgCl | 455 | 9 | HgCl$_2$ | 276 | 47 |
| AgBr | 432 | 10 | HgBr$_2$ | 238 | 45 |
| CaCl$_2$ | 782 | 14 | HgI$_2$ | 259 | 75 |
| CaBr$_2$ | 730 | 17 | BiCl$_3$ | 232 | 38 |
| SrCl$_2$ | 875 | 13 | BiBr$_3$ | 218 | 34 |
| SrBr$_2$ | 643 | 13 | BiI$_3$ | 408 | 57 |
| BaCl$_2$ | 963 | 14 | AlI$_3$ | 191 | 86 |
| BaBr$_2$ | 847 | 18 | GaI$_3$ | 212 | 78 |
| BaI$_2$ | 740 | 19 | InI$_3$ | 210 | 59 |

What is claimed is:

1. An optical system, comprising:
   a source of electromagnetic radiation; and
   transmission means, in optical communication with said source, for transmitting at least a portion of said radiation, said transmission means including a glass body, characterized in that
   said glass body includes at least one material region having a composition which includes at least two halides, with each of said halides including the same halogen,
   said source is chosen in relation to the composition of said glass body so that the wavelength of at least a portion of said electromagnetic radiation is substantially equal to $\lambda_{min}$, the wavelength at which an optical loss coefficient for said glass body as a whole, $\bar{\alpha}$, is minimized, the loss coefficient at each point of said material region, $\alpha$, being equal to the sum of the weighted, multiphonon absorptions associated with the individual halides, with each weight being equal to the corresponding halide mole fraction at that point, and the intrinsic scattering associated with said region at that point.

2. The optical system of claim 1 wherein said glass body includes an optical fiber.

3. The optical system of claim 1 further comprising a detector of electromagnetic radiation in optical communication with said transmission means.

4. The optical system of claim 1 further comprising a sensor in optical communication with said transmission means.

* * * * *